(12) United States Patent
Barone, Jr. et al.

(10) Patent No.: US 7,607,149 B2
(45) Date of Patent: Oct. 20, 2009

(54) SYSTEM AND METHOD FOR MERGING INTERACTIVE TELEVISION DATA WITH CLOSED CAPTION DATA

(75) Inventors: Samuel T. Barone, Jr., Los Angeles, CA (US); Drake Smith, Oxford, CT (US); David Davis, West Hartford, CT (US); Thomas Stone, Beacon Falls, CT (US)

(73) Assignee: GoldPocket Interactive, Inc., Los Angeles, CA (US)

( * ) Notice: Subject to any disclaimer, the term of this patent is extended or adjusted under 35 U.S.C. 154(b) by 2202 days.

(21) Appl. No.: 09/840,497

(22) Filed: Apr. 23, 2001

(65) Prior Publication Data
US 2002/0129381 A1    Sep. 12, 2002

Related U.S. Application Data

(60) Provisional application No. 60/198,840, filed on Apr. 21, 2000.

(51) Int. Cl.
*H04N 7/10* (2006.01)
*H04N 7/16* (2006.01)

(52) U.S. Cl. .......................................... 725/32; 725/136
(58) Field of Classification Search ................... 725/33, 725/135, 136, 137, 32; 348/461, 465, 468, 348/473, 564
See application file for complete search history.

(56) References Cited

U.S. PATENT DOCUMENTS

| | | | |
|---|---|---|---|
| 4,918,516 A | 4/1990 | Freeman | 358/86 |
| 5,428,400 A * | 6/1995 | Landis et al. | 348/569 |
| 5,774,664 A | 6/1998 | Hidary et al. | 395/200.48 |
| 5,774,666 A | 6/1998 | Portuesi | 395/200.48 |
| 5,850,218 A | 12/1998 | LaJoie et al. | 345/327 |
| 5,990,927 A | 11/1999 | Hendricks et al. | 348/6 |
| 6,002,394 A | 12/1999 | Schein et al. | 345/327 |
| 6,141,336 A * | 10/2000 | Bauchot et al. | 370/348 |
| 6,173,317 B1 | 1/2001 | Chaddha et al. | 709/219 |
| 6,637,032 B1 * | 10/2003 | Feinleib | 725/110 |
| 2002/0064177 A1 * | 5/2002 | Bertram et al. | 370/458 |

OTHER PUBLICATIONS

"Line 21 Data Services"; EIA Standard; EIA/CEA-608-B; Oct. 2000; 151 pp.

(Continued)

*Primary Examiner*—James Sheleheda
(74) *Attorney, Agent, or Firm*—Christie, Parker & Hale, LLP.

(57) ABSTRACT

A method and apparatus for delivering interactive television (ITV) data by using the same TV scan line that also carries closed caption data. The ITV data is inserted into the scan line with CC data by detecting a gap associated with a first CC data unit. If the gap is large enough to contain all of the group of ITV data units then electronically insert the entire group of ITV data units into the gap. If the gap is not large enough to contain the entire group of ITV data units, insert a subset of the entire group of the ITV data units into the gap and continue to the gaps associated with successive CC data units, inserting subsets of the ITV data into subsequent gaps until the entire ITV message has been inserted into the gaps between CC data units.

20 Claims, 11 Drawing Sheets

OTHER PUBLICATIONS

"Transport of Internet Uniform Resource Locator (URL) Information Using Text-2 Service"; EIA Standard; EIA-746-A; Sep. 1998; 13 pp.

PCT International Search Report dated Dec. 27, 2001 from corresponding PCT application No. PCT/US01/12961 filed Apr. 23, 2001.

* cited by examiner

SYSTEM AND METHOD FOR MERGING INTERACTIVE TELEVISION DATA WITH CLOSED CAPTION DATA

CROSS-REFERENCE TO RELATED APPLICATIONS

This application claims the benefit of U.S. provisional application No. 60/198,840, filed on Apr. 21, 2000, the content of which is incorporated herein by reference.

FIELD OF THE INVENTION

This invention relates generally to interactive television systems, and more particularly to a system and method for electronically merging interactive television data with closed caption data.

BACKGROUND OF THE INVENTION

An interactive television (ITV) program provides a viewer with an opportunity to interact with a television show that is currently being viewed. For example, if the show is a game show including contestants, an interactive version of the show may allow viewers to play along with the contestants in the show. In order for a viewer to participate in the ITV program, the viewer must generally be equipped with a television receiver that is capable of receiving ITV programming, and the program must generally be produced with ITV data that is broadcast with the television program.

ITV data is currently encoded into field 1, scan line 21 of a television video, in accordance with a standard set forth by the Electronic Industries Alliance (EIA), the EIA-746-A standard, entitled "Transport of Internet Uniform Resource Locator (URL) Information Using Text-2 Service," the content of which is incorporated herein by reference. Field 1, scan line 21 is commonly referred to as a vertical blanking interval (VBI).

Also encoded in the VBI line of a television video is closed caption data used to display closed caption text following the dialogue and other audio data present in the television program. The closed caption data is encoded into the VBI line according to a EIA-608 standard entitled "Recommended Practice for Line 21 Data Services," the content of which is also incorporated herein by reference.

Because both ITV data and closed caption data share a single data channel, namely, the same VBI line, the ITV and closed caption data are transmitted in a time multiplexed format to accommodate both services. If the ITV data and closed caption data are transmitted at exactly the same time in the VBI line, a timing conflict results.

Both the closed caption data service and the ITV data service, however, are generally time critical data services commonly created by separate groups of people. The author of the closed caption service for a television program specifies exactly when a certain caption is to appear on the television screen. The author preferably times the appearance and erasure of the captions based on the program's dialog. Similarly, the creator of the ITV content may time the ITV data based on events that happen in the television program.

In some instances, the ITV data may cause timing conflicts with the closed caption data. In such instances, a lower priority data yields to a higher priority data. Currently, ITV data is deemed to be of lower priority than closed caption data. Thus, although it is desirable to transmit the ITV data at the exact time specified by its author, the ITV data currently yields to closed caption data when a timing conflict occurs. The ITV data may not delay, block, or modify the higher priority closed caption data.

If timing conflicts occur, they are generally not detected until the ITV data is merged with the closed caption data. In most cases, the group creating the ITV content does not have access to the closed caption content when creating the ITV data. Timing conflicts, therefore, cannot be avoided until late in the process of producing the television show after the ITV data has been created. When a timing conflict is detected, the lower priority conflicting ITV data is generally manually shifted to an available time spot to avoid the conflict. The shift in time of the ITV data, however, may be significant, causing noticeable discrepancies between the display of the interactive content and a desired event.

Accordingly, there is a need for a system and method for merging ITV data with closed caption data that causes the merging to occur without disturbing the closed caption data and with minimum timing conflicts. In addition, the system and method should cause the merging to occur in such a way that the timing of the ITV data is maintained as close as possible to the desired event times.

SUMMARY OF THE INVENTION

The present invention is directed to a system and method for electronically merging an ITV data stream with a closed caption data stream by segmenting the ITV data stream and placing the various segments into existing or created gaps in the closed caption data stream. According to one embodiment of the invention, an interactive television system includes a first input for receiving a first data stream, a second input for receiving a second data stream, and a processing unit coupled to the first input and the second input. The first data stream preferably has a higher priority than the second data stream. The processing unit creates a gap in the first data stream for inserting at least a portion of data carried by the second data stream. The gap is preferably selected in a location in the first data stream so as to allow the data carried by the second stream to be displayed as close to a desired time as possible without disrupting display of data carried by the first data stream.

According to another embodiment of the invention, an interactive television system includes a first input for receiving a first data stream having a plurality of first data units, a second input for receiving a second data stream having a plurality of second data units, and a processing unit coupled to the first input and the second input. The processing unit preferably creates a gap between two first data units in the first data stream and inserts a first portion of the plurality of second data units into the created gap. The processing unit further detects another gap in the first data stream and electronically inserts a second portion of the plurality of second data units into the detected gap.

According to a further embodiment of the invention, an interactive television system includes a first input for receiving a first data stream having a plurality of first data units, a second input for receiving a second data stream having a plurality of second data units, and a processing unit coupled to the first input and the second input. The processing unit preferably identifies time slots of a television signal assigned to the plurality of first data units in the first data stream and reassigns a portion of the plurality of first data units assigned to particular time slots to earlier time slots. The processing unit further assigns at least a portion of the plurality of second data units in the second data stream to the particular time slots.

It should be appreciated, therefore, the present invention helps provide improved time synchronization for ITV data. The present invention maximizes the use of a television signal for inserting the ITV data as close to a desired time as possible, while maintaining the integrity of the closed caption data.

DESCRIPTION OF THE DRAWINGS

These and other features, aspects and advantages of the present invention will be more fully understood when considered with respect to the following detailed description, appended claims, and accompanying drawings where:

DESCRIPTION OF SPECIFIC EMBODIMENTS

Figure 1:
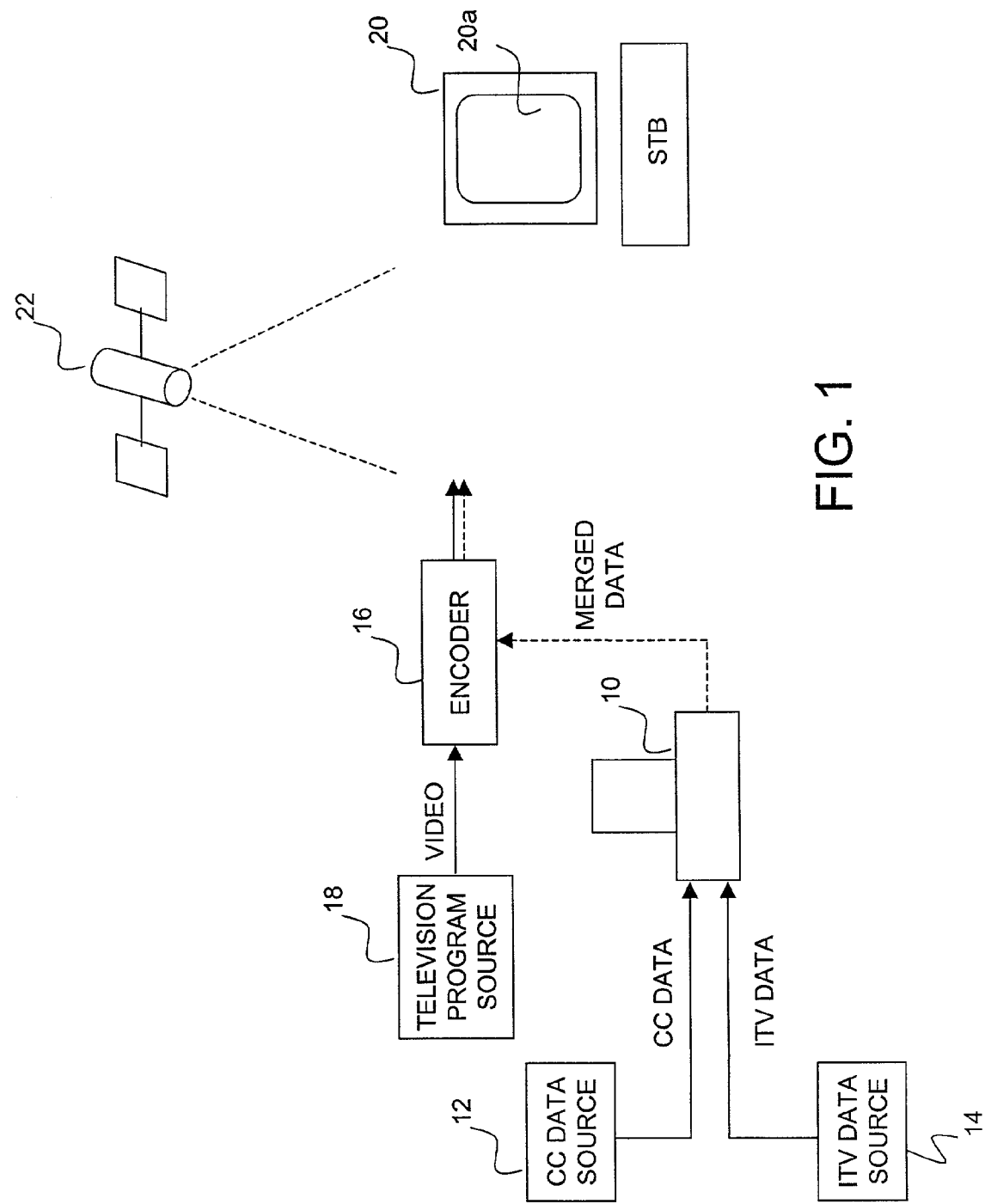
FIG. 1 is a schematic block diagram of an interactive television system according to one embodiment of the invention.

FIG. 1 is a schematic block diagram of an interactive television (ITV) system according to one embodiment of the invention. The system preferably includes a data processor 10 receiving closed caption (CC) data and ITV data respectively from a CC data source 12 and an ITV data source 14. CC data may include, but is not limited to alphanumeric characters, command codes, and other data set forth in EIA-608. ITV data may include, but is not limited to graphics data, alphanumeric characters, command codes, Uniform Resource Locators (URLs), and other data set forth in EIA-608 and EIA-706-A. The data processor 10 is preferably a computer or any broadcast video or data processing equipment. The CC and ITV data sources 12, 14 may include hard disk drives, CD ROMs, DADS, external computers, or other data transmission devices.

The data processor 10 preferably merges the ITV data with the CC data, and outputs the merged data to a data encoder 16. The data encoder may take the form of any conventional encoder known in the art. The data encoder 16 receives a television video signal from a television program source 18 and encodes the merged ITV and CC data into the television video signal. The television program source 18 may include a playback VTR, DVD, or any other video transmission device known in the art.

The television video signal encoded with the merged ITV and CC data is then transmitted to a receiving television unit 20 over a transmission medium 22. The transmission medium includes, but is not limited to satellite, antenna, cable, or any other conventional television broadcasting device. The television unit 20 preferably includes a memory (not shown) for loading the CC text and ITV content, as well as a screen 20a for displaying the loaded CC text and ITV content. The loading of the CC text and ITV content into memory may be referred to as a build process.

Figure 2:
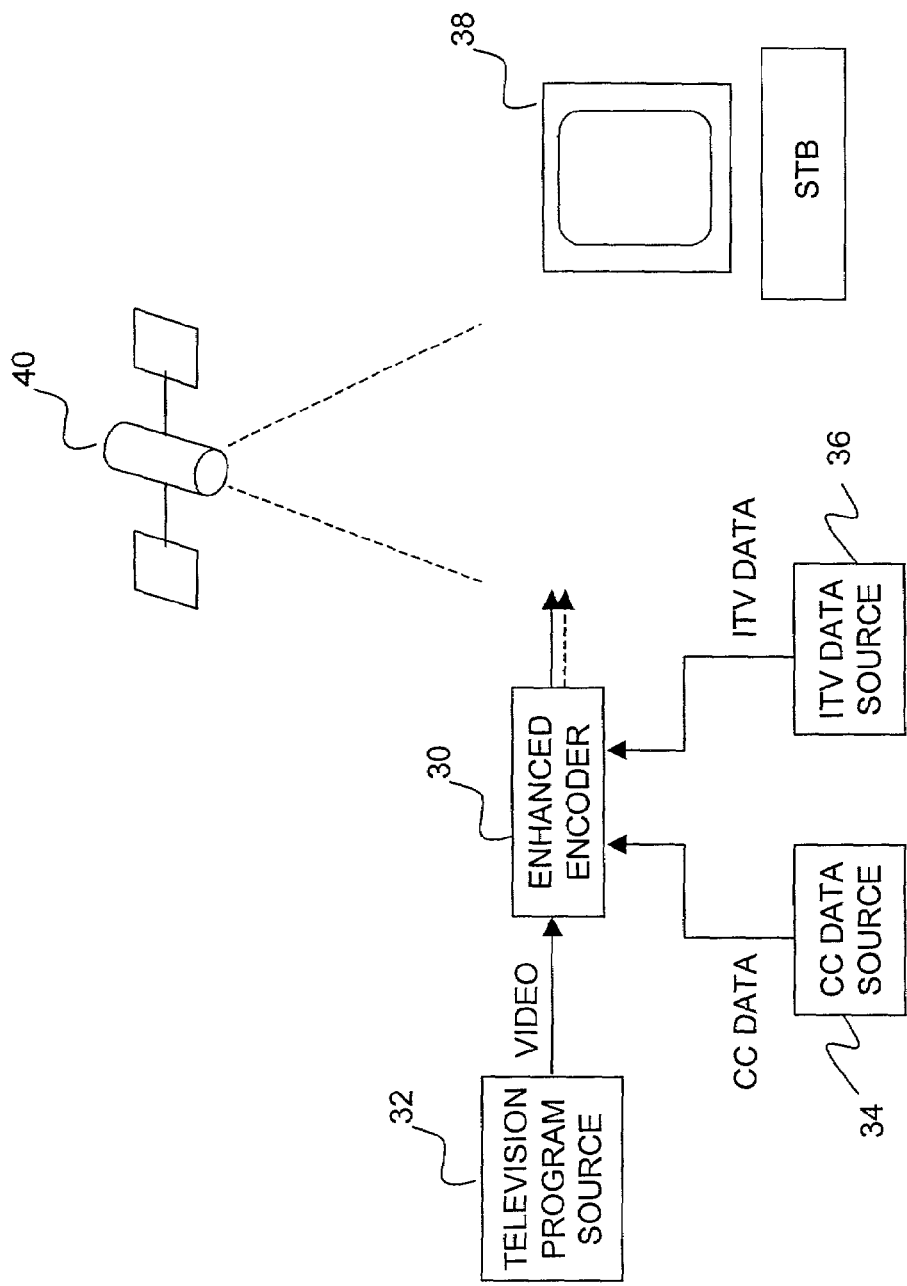
FIG. 2 is a schematic block diagram of an interactive television system according to an alternative embodiment of the invention.

FIG. 2 is a schematic block diagram of an ITV system according to an alternative embodiment of the invention. Unlike the ITV system illustrated in FIG. 1, the merging of the CC and ITV data according to this embodiment does not occur in a separate data processor 10, but within an existing video or data processing equipment. The ITV system according to this embodiment preferably includes an enhanced data encoder 30 which may be similar to the data encoder 16 of FIG. 1. The enhanced data encoder 30, however, includes logic and/or circuitry for merging CC and ITV data received from CC and ITV data sources 34, 36. The CC and ITV data sources 34, 36 may be similar to the CC and ITV data sources 12, 14 of FIG. 1.

The enhanced data encoder 30 receives a television video signal from a television program source 32, and encodes the merged data into the video signal. The encoded video signal is then transmitted to a television unit 38 over a transmission medium 40, such as, for example, satellite, cable, antenna, and the like.

Figure 3:
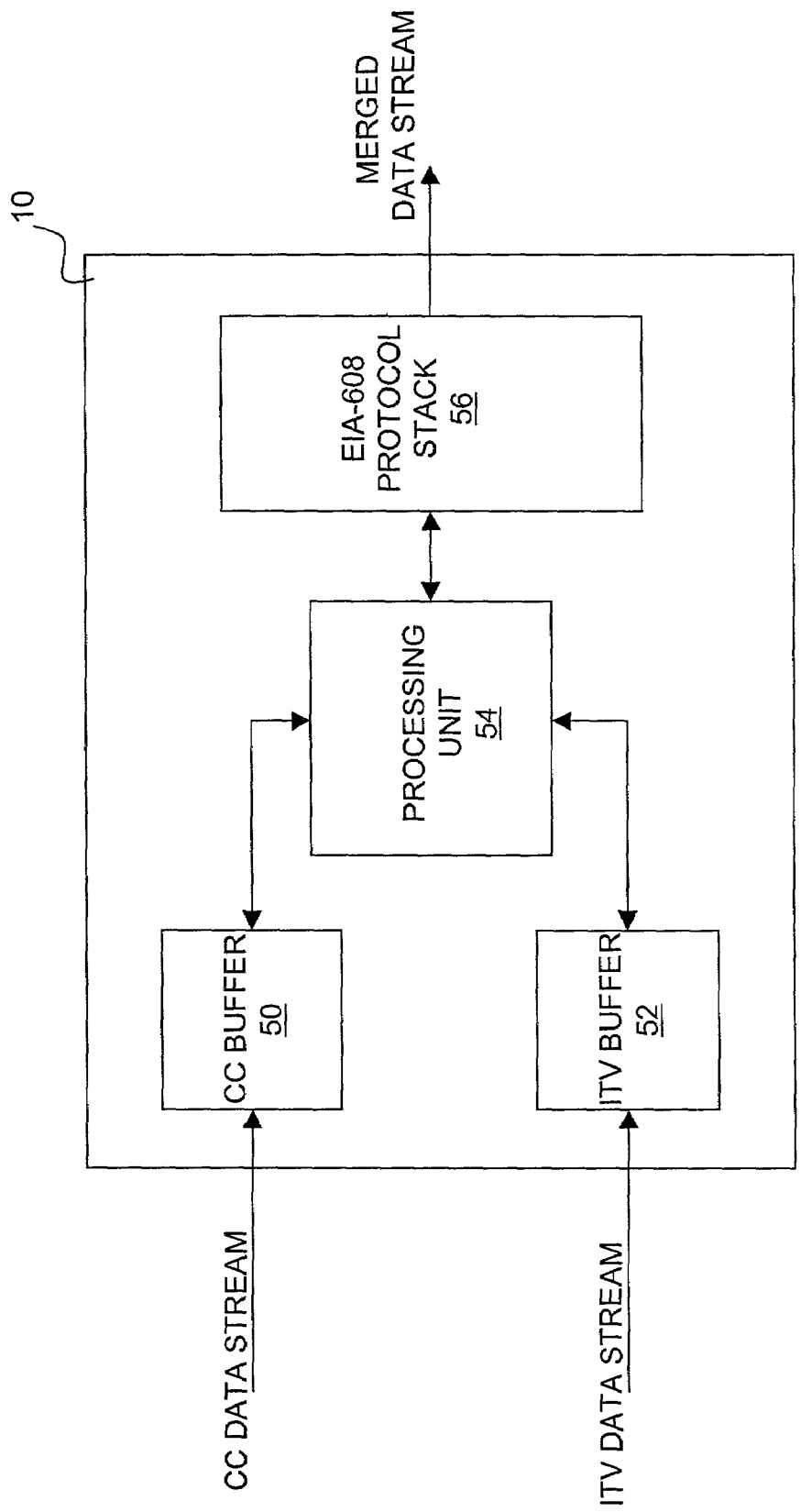
FIG. 3 is a more detailed block diagram of a data processor of FIG. 1, which is also representative of an enhanced data encoder of FIG. 2.

FIG. 3 is a more detailed block diagram of the data processor 10 of FIG. 1, which is also representative of the enhanced encoder 30 of FIG. 2. It is understood, of course, that FIG. 3 illustrates a block diagram of the data processor/enhanced encoder without obfuscating inventive aspects of the present invention with additional elements and/or components that may be required for operating the data processor/enhanced encoder. These additional elements and/or components, which are not shown in FIG. 3 are well known to those skilled in the art.

The data processor 10 preferably includes a CC buffer 50, ITV buffer 52, processing unit 54, and a telecommunications protocol stack 56. The data processor 10 receives the CC data stream via a first input 51 and preferably stores it into the CC buffer 50. The data processor 10 also receives the ITV data stream via a second input 53 and preferably stores it into the ITV buffer 52. The first and second inputs 51, 53 may be the same or different, and may include cables, disk drives, and the like.

The CC and ITV buffers 50, 52 preferably provide the stored data streams or portions thereof, to the processing unit 54. The processing unit 54 is preferably programmed with instructions to merge the ITV data stream into the CC data stream according to the protocol indicated in the telecommunications protocol stack 56. The indicated protocol is preferably the EIA-608 protocol. The instructions to merge the data streams further include instructions to resolve timing conflicts between the CC and ITV data streams.

In general terms, the data processor 10 receives a CC data stream including CC data units assigned to particular time slots of a television signal. The time slots are preferably assigned by an author of the CC data stream who preferably selects the time slots so that a display of the CC text on the receiving television unit 20 may be synchronized with the audio portion of a television program transmitted to the television unit via the television signal. The received CC data stream is stored in the CC buffer 50.

The data processor 10 also receives an ITV data stream including ITV data units assigned to particular time slots of the television signal. The time slots are preferably assigned by an author of the ITV data stream who preferably selects the time slots so that a display of the interactive content on the receiving television unit 20 may be synchronized with a particular event occurring on the transmitted television program. The received ITV data stream is stored in the ITV buffer 52.

The processing unit 54 preferably accesses the CC and ITV buffers 50, 52 for merging the received CC data stream with the ITV data stream and encoding the merged data stream into the television signal. In creating the merged data stream, the processing unit 54 maintains the originally assigned time slots for both the CC data and the ITV data to the extent possible. However, if a group of ITV data units are assigned to the same time slots as a group of CC data units, the conflicting group of ITV data units is preferably broken into two or more segments, and the segment containing a command to reveal the group of ITV data units is maintained in, or as close as possible to, its originally intended time slot. The remaining segments are preferably placed in gaps found in earlier time slots of the CC data stream. A gap preferably includes one or more time slots containing no data units.

The processing unit 54 preferably adheres to the EIA-608 protocol stored in the telecommunications protocol stack 56 for creating the merged data stream. The telecommunications protocol stack 56 outputs the merged data stream via a data link, preferably a RS-232 link. The merged data stream is then encoded into the video signal of the television program by a separate encoder, such as the data encoder 16 of FIG. 1. Alternatively, the encoding occurs within the data processor itself.

Figure 4A:
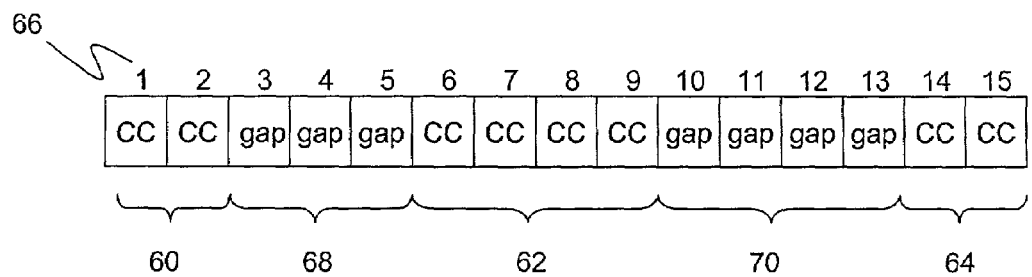
FIG. 4A is an illustration of an exemplary closed caption data stream.

FIG. 4A is an illustration of an exemplary CC data stream. The CC data stream according to this example includes three groups of CC data units 60, 62, 64, each group including CC payload data and CC command data. A group of CC data units is preferably a separate CC message. The CC data stream also contains gaps 68, 70 associated with time slots containing no data units.

Preferably, the CC payload data in CC data groups 60, 62, 64 include CC text displayed on the screen 20a of the receiving television unit 20. The CC text is preferably loaded into the memory of the television unit 20 and not retrieved for display on the screen 20a until receipt of a CC reveal command also included in the CC data group. The CC payload data is thus preferably inserted into time slots earlier than a desired reveal time, allowing the build process to begin prior to its display. The CC reveal command is preferably inserted into one or more time slots coinciding with the desired reveal time for the CC text.

For purposes of the examples described herein, it is assumed that the size of each time slot is one byte, each CC or ITV command is two bytes, and each CC or ITV data character is one byte. In the example illustrated for CC data group 62, if the CC reveal command occupies time slots 8 and 9 and the CC payload data occupies time slots 6 and 7, the CC payload data is loaded at times 6 and 7 and maintained in the memory of the television unit 20 until receipt of the CC reveal command at the later times 8 and 9.

Figure 4B:
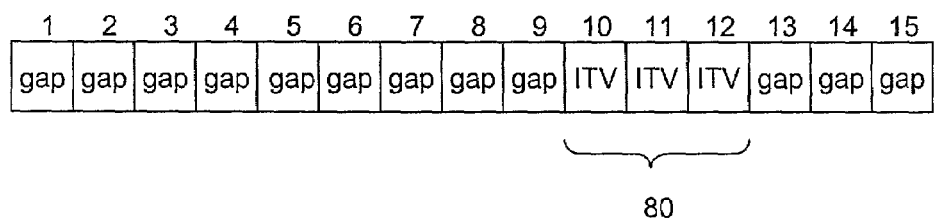
FIG. 4B is an illustration of an exemplary interactive television data stream.

FIG. 4B is an illustration of an exemplary ITV data stream. The ITV data stream according to this example includes a group of ITV data units 80 including ITV payload data and ITV command data. The group of ITV data units 80 is preferably a separate ITV message. Preferably, the ITV payload data includes alphanumeric data, graphical data, image data, and the like, for display on the screen 20a of the receiving television unit 20. Similar to the CC payload data, the ITV payload data is preferably loaded into the memory of the television unit 20 and not retrieved for display until receipt of an ITV reveal command. The ITV payload data is thus preferably inserted into time slots earlier than a desired reveal time, allowing the build process to begin prior to its display. The ITV reveal command is preferably inserted into one or more time slots coinciding with a time of an event occurring in the television program.

Figure 4C:
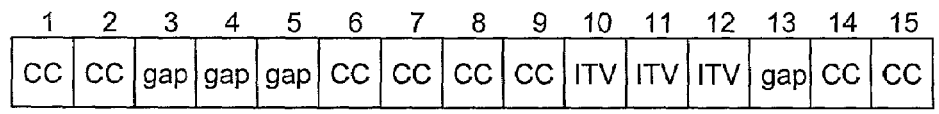
FIG. 4C illustrates the interactive television data stream of FIG. 4B merged into the closed caption data stream of FIG. 4A.

FIG. 4C illustrates the ITV data stream of FIG. 4B merged into the CC data stream of FIG. 4A. According to the illustrated example, the time slots originally allocated to the ITV data group 80 in the ITV data stream are available in the CC data stream. Thus, the ITV data stream is placed into the available time slots 10-12, allowing the original timing for the ITV data to be maintained.

Figure 5A:
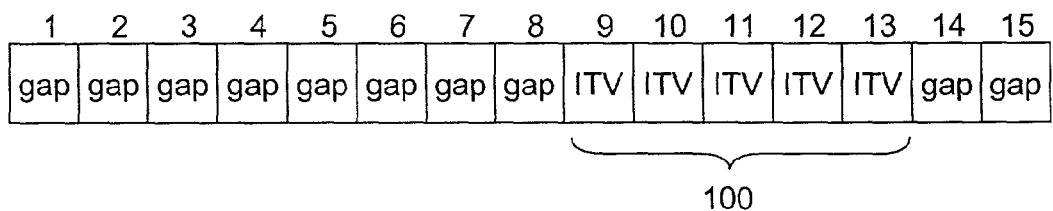
FIG. 5A is an illustration of another exemplary interactive television data stream.

FIG. 5A is an illustration of another exemplary ITV data stream received by the data processor 10. According to this example, the stream includes a group of ITV data units 100 in time slots 9-13 which payload portion is to be displayed by time slot 13.

Figure 5B:
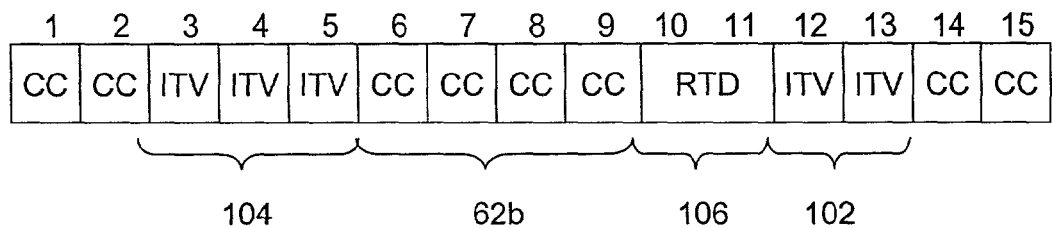
FIG. 5B illustrates the interactive television data stream of FIG. 5A merged into the closed caption data stream of FIG. 4A.

FIG. 5B illustrates the ITV data stream of FIG. 5A merged into the CC data stream of FIG. 4A. In merging the two data streams, the data processor 10 detects that gaps exist in time slots 10-13 in the CC data stream, but time slot 9 contains a CC data unit. Thus, the ITV data unit originally assigned to time slot 9 preferably yields to the CC data unit also assigned to the same time slot. The data processor 10 segments the ITV data stream into two segments 102, 104, and places as much of the last portion of the ITV data stream 100 containing the ITV reveal command, into originally assigned time slots 10-13, and places the remaining portions into gaps 68 of the CC data stream associated with time slots 3-5.

According to one embodiment of the invention, the ITV data stream 100 is segmented using a resume text display (RTD) command 106 set forth in EIA-608. The RTD command is preferably of a fixed size, such as, for example, two bytes long. The RTD command resumes the loading and display of segmented ITV data streams when such loading and display has been interrupted with the loading and display of other data units, such as, for instance, CC data units. An ITV data stream may be segmented as follows: <beginning of ITV message> <other data> [RTD] <end of ITV message>.

In the illustrated example, the loading of the ITV data units associated with segment 104 is interrupted by the loading of CC data unit group 62b. The RTD command 106 following the CC data unit group 62b allows the remaining ITV data units associated with segment 102, to be loaded and displayed. Although, the build process for the ITV data stream 100 begins earlier than originally intended by the author of the data stream, the ITV content is displayed at the time originally intended by the author because the timing of ITV reveal command remains the same.

Figure 6:
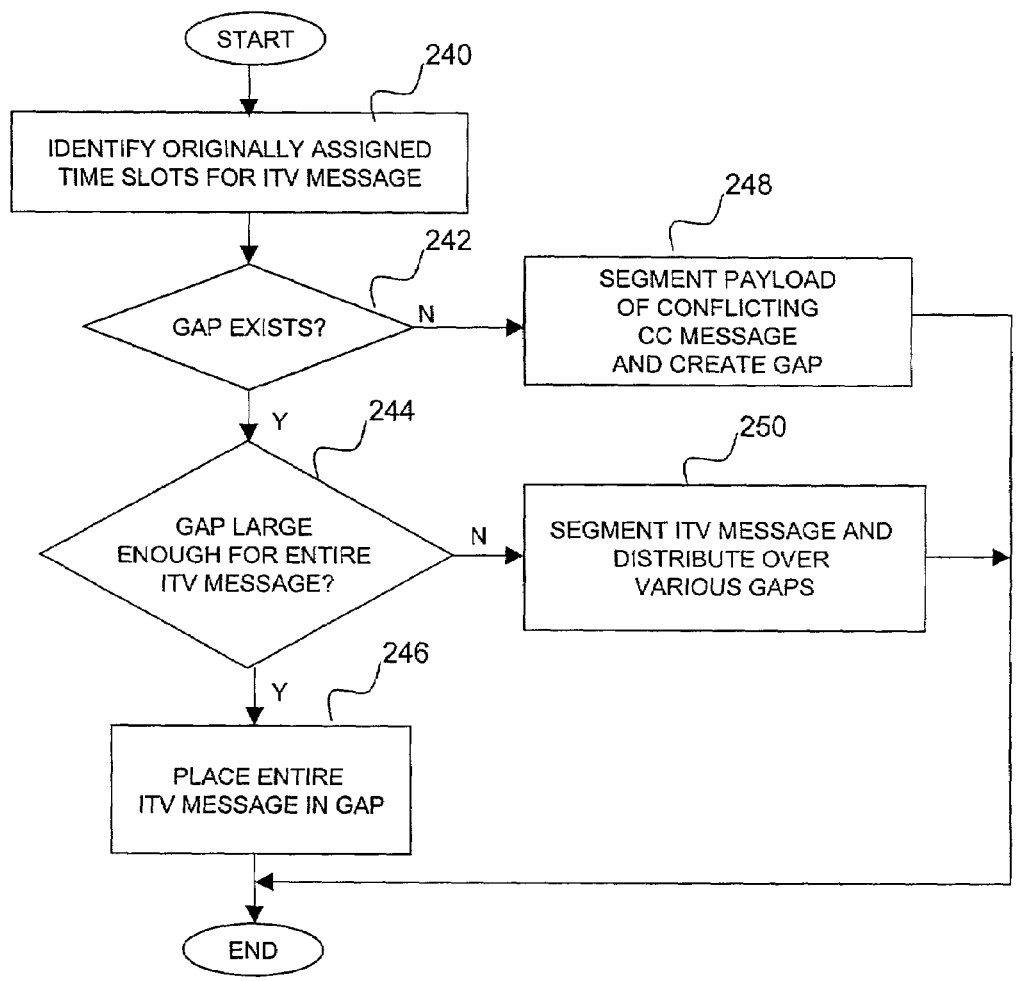
FIG. 6 is a generalized flow diagram for merging an interactive television data stream into a closed caption data stream according to one embodiment of the invention.

FIG. 6 is a generalized flow diagram for merging an ITV data stream into a CC data stream for transmitting in a television signal according to one embodiment of the invention.

The process starts, and in step 240, the data processor 10 identifies originally assigned time slots for an ITV message made up of one or more ITV data units. In step 242, a determination is made as to whether a gap exists in the CC data stream at the originally assigned time slots. If a gap exists, a determination is made in step 244 as to whether the gap is large enough to contain the entire ITV message. If the gap is large enough, the data processor 10, in step 246, places the entire ITV message into the identified gap. If the gap is not large enough, the data processor 10, in step 250, segments the ITV message and distributes the segments over various gaps. CC messages preferably include one or more CC data units.

On the other hand, if no gap exists at the desired time slots, the data processor 10, in step 248, segments the payload portion of the conflicting CC message and creates a gap for inserting at least the ITV command data as close to the desired time slot as possible.

Figure 7:
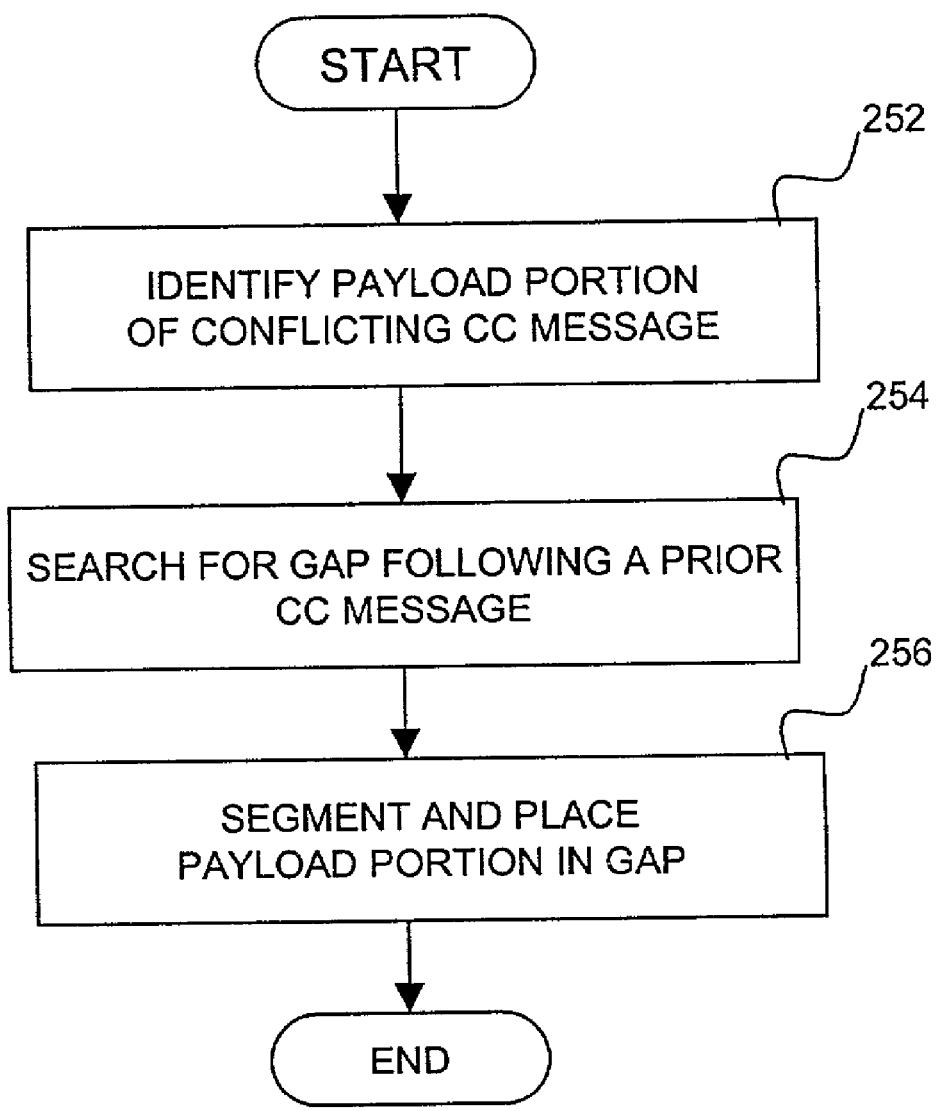
FIG. 7 is a flow diagram of segmenting the payload portion of conflicting closed caption data units and creating a gap.

FIG. 7 is a more detailed flow diagram of step 248 of segmenting the payload portion of the conflicting CC data units and creating a gap. In step 252, the data processor 10 identifies the payload portion of the conflicting CC message. In step 254, the data processor searches back in time for a gap following a prior CC message. In step 258, the data processor 10 segments the payload data and places it in the gap.

Figure 8:
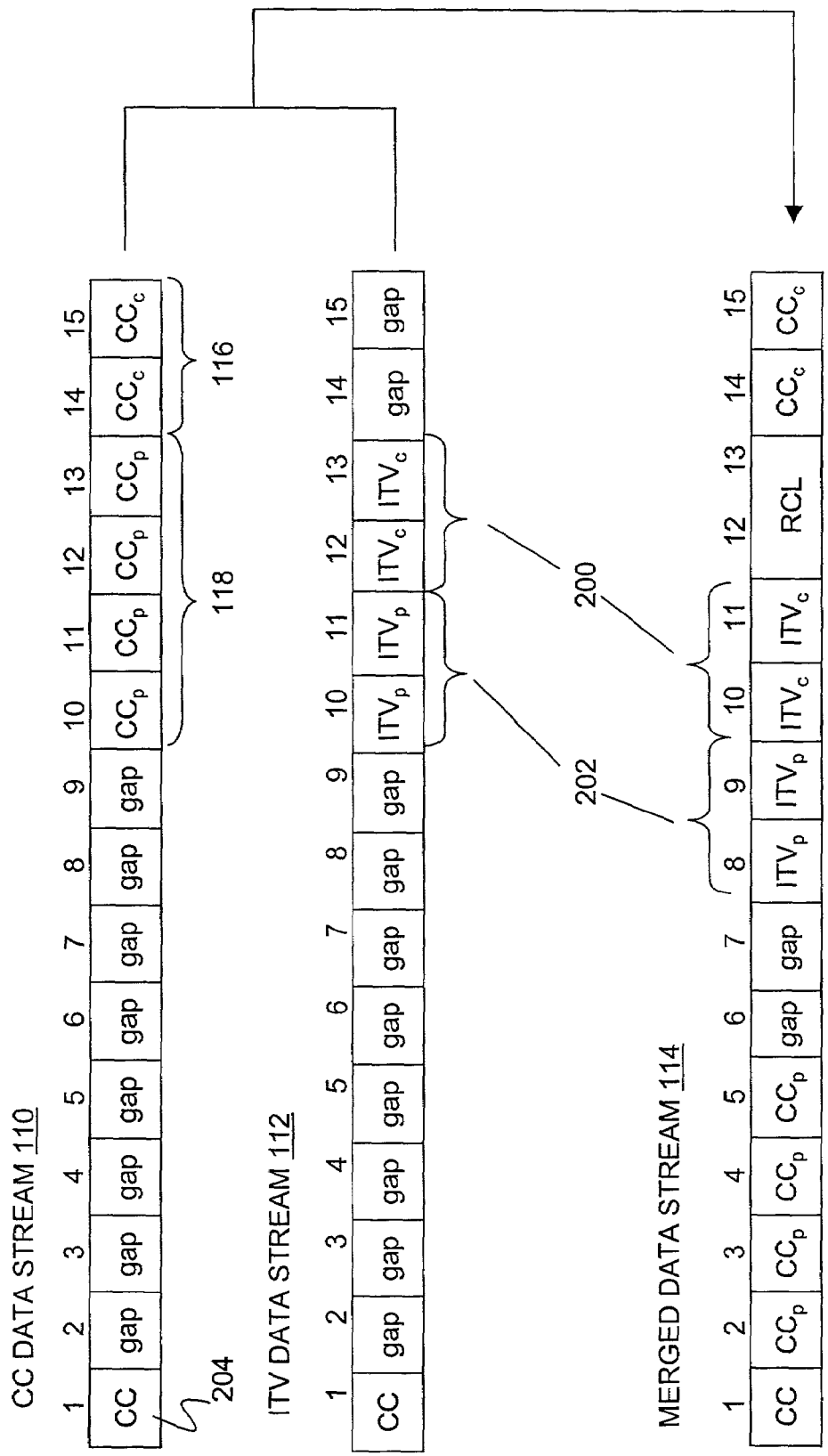
FIG. 8 illustrates an exemplary closed caption data stream, an exemplary interactive television data stream, and a merged data stream created by segmenting a conflicting closed caption message according to one embodiment of the invention.

FIG. 8 illustrates an exemplary CC data stream 110, an exemplary ITV data stream 112, and a merged data stream 114 created by segmenting a conflicting CC message according to one embodiment of the invention. The CC data stream 110 preferably includes CC data units including CC command data 116 and CC payload data 118. The CC command data 116 is preferably a reveal command for triggering the display of the CC text transmitted as the CC payload data.

The ITV data stream 112 similarly includes ITV data units including ITV command data 200 and ITV payload data 202. The ITV command data 200 is preferably a reveal command for triggering the display of the interactive content transmitted as the ITV payload data.

In the illustrated example, time slots 10-13 originally assigned to the ITV data units conflict with the CC payload data 118. The data processor 10 preferably resolves the conflict in creating the merged data stream in such a way that the reveal time of the ITV data stream is maintained as close as possible to its originally assigned reveal time. The data processor 10 preferably segments the CC data in order to make room for at least the ITV command data and a resume caption load ("RCL") command set forth in EIA-608. The RCL command is preferably of a fixed size, such as, for example, two bytes long. The RCL command resumes the loading and display of segmented CC data streams when such loading and display has been interrupted with the loading and display of other data units, such as, for instance, ITV data units. Thus a CC data stream may be segmented as follows: <beginning of CC message> <other data> [RCL] <end of CC message>.

The data processor 10 in the illustrated example segments the CC payload data 118 of the CC data stream 110 and moves it to available earlier time slots. According to one embodiment of the invention, the data processor 10 locates a gap between the current CC data and a preceding CC data 204, and assigns the CC payload data 118 in the located gap. In the illustrated example, the payload data 118 is moved to time slots 2-5, causing its build process to begin earlier in time than initially anticipated. The timing of the display of the CC text, however, remains the same since the CC command data 116 is unaltered.

The timing of the display of the interactive content remains as close to its originally assigned time slot as possible. According to the EIA-608 standard, the RCL command is inserted into time slots 12 and 13 to cause the CC data in time slots 14 and 15 to resume loading. The ITV command data 200 which triggers the display of the interactive content is assigned to the next available time slots 10 and 11. The ITV payload data 202 is assigned to available time slots 8 and 9. Alternatively the payload data 202 is assigned to available time slots 6 and 7.

Figure 9:
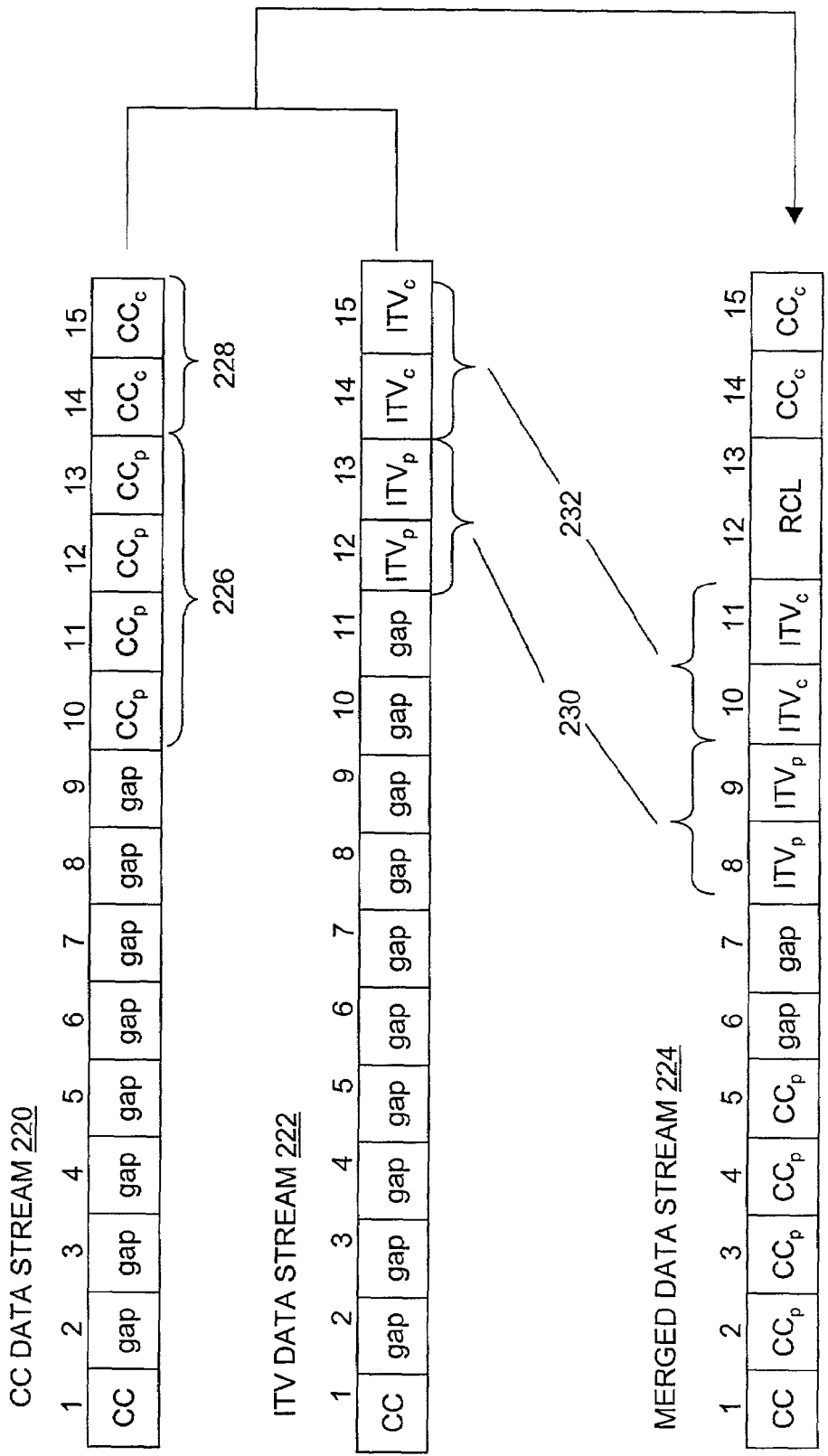
FIG. 9 is another example of merging an exemplary closed caption data stream and an exemplary interactive television data stream to create a merged data stream.

FIG. 9 is another example of merging an exemplary CC data stream 220 and an exemplary ITV data stream 222 to create a merged data stream 224. Like the CC data stream 110 of FIG. 8, the CC data stream 220 of FIG. 9 includes CC payload data 226 in time slots 10-13 and CC command data 228 in time slots 14 and 15. But, unlike the ITV data stream 112 of FIG. 8, the ITV data stream 222 in FIG. 9 includes ITV payload data 230 in time slots 12 and 13, and ITV command data 232 in time slots 14 and 15. The merged data stream 224, however, is preferably the same as the merged data stream 114 of FIG. 8. Although a timing conflict arises at time slots 14 and 15, the CC command data 118 which dictates the display of the CC text does not yield to the lower priority data ITV data stream 112. Thus, only the CC payload data 226 is segmented and moved to earlier time slots. After the shift of the CC payload data 226 to time slots 2-5, the ITV command data is assigned to available time slots 10 and 11, which are closest to their original time slots after the insertion of an RCL command in time slots 12 and 13.

Figure 10:
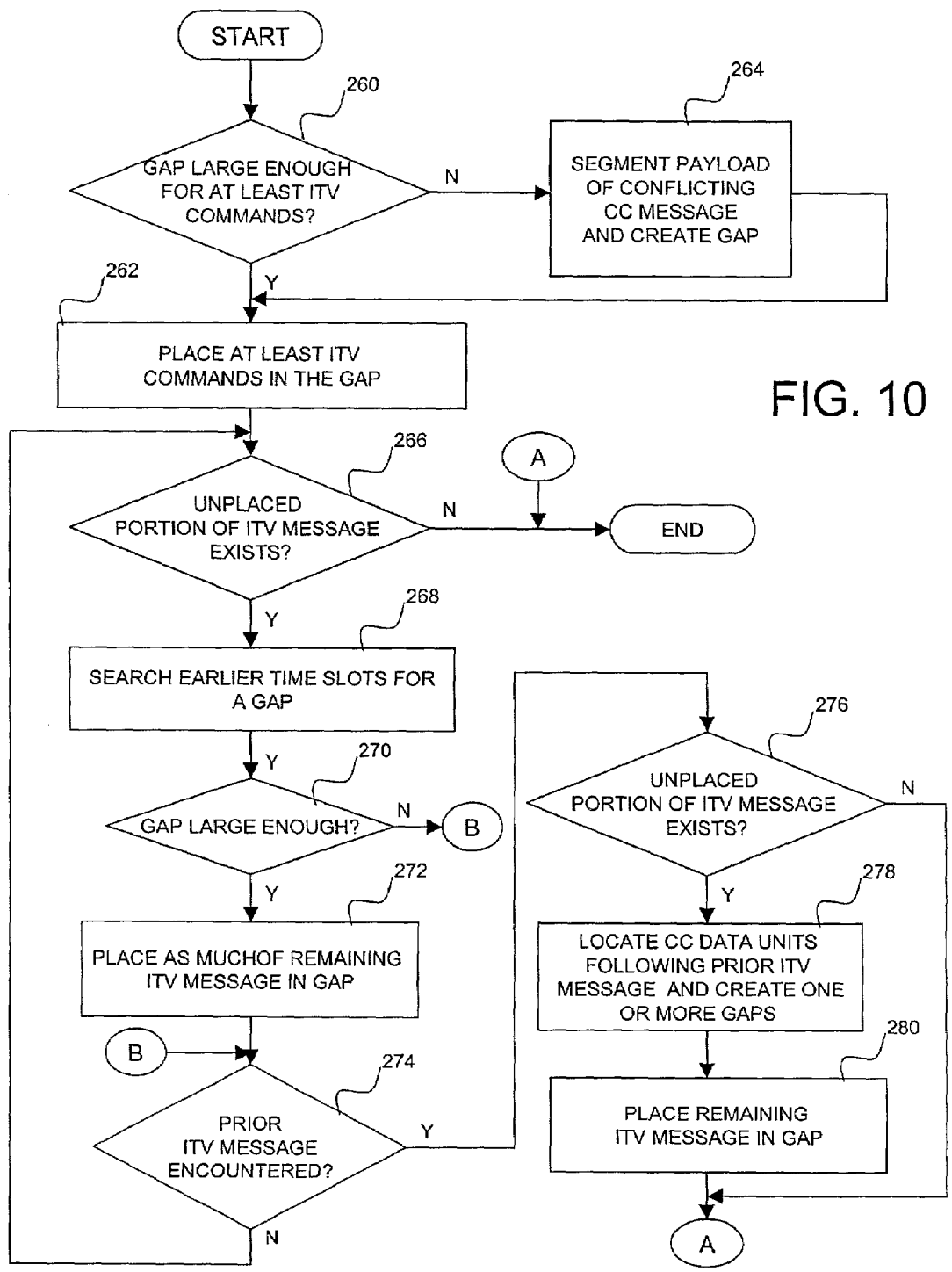
FIG. 10 is a flow diagram for segmenting an interactive television message and placing the message into gaps between closed caption messages according to one embodiment of the invention.

FIG. 10 is a more detailed flow diagram of step 250 of segmenting an ITV message and placing the message into gaps between CC messages according to one embodiment of the invention. In step 260, the data processor 10 determines if the identified gap, although not large enough to contain the entire ITV message, is large enough to contain at least the ITV command data. The ITV command data is preferably a reveal command and a RTD command for resuming the loading and display of the segmented data. If the answer is NO, the data processor, in step 264, segments the payload portion of the conflicting CC message and creates a gap.

If, however, the initial gap is large enough for at least the ITV command data, the data processor 10, in step 262, preferably places the ITV command data and as much of the remaining data units as will fit into the gap. In step 266, the data processor 10 determines if unplaced portions of the ITV message exist. If the answer is YES, the data processor, in step 268, searches earlier time slots for a gap. In step 270, the data processor determines if the identified gap is sufficiently large. Preferably, the gap is large enough to contain at least a portion of the ITV message. If the answer is YES, the data processor, in step 272 places as much of the remaining ITV message in the gap.

In step 274, the data processor determines if a prior ITV message was encountered during the search for a gap. A prior ITV message includes display commands for loading and displaying the ITV message. Inserting portion of a current ITV message in time slots earlier than the time slot of the display command for the prior ITV message causes a premature loading and display of the current portion of the ITV message. Thus, the portions of the current ITV message are preferably inserted in time slots after the display command for the prior ITV message. Accordingly, if a prior ITV message was encountered, the data processor 10, in step 276, determines if unplaced portions of the ITV message exists. If the answer is NO, the entire ITV message has been placed, and the process ends.

Otherwise, if unplaced portions of the ITV message exists, the data processor, in step 278, locates intervening CC data units and creates a gap between the CC data for inserting the portions of the current ITV message. In this regard, the data processor locates one or more groups of CC data units following the prior ITV message and segments the payload portion of the CC data for creating gaps. In step 280, the data processor 10 inserts the remaining ITV message into the created gap.

Figure 11:
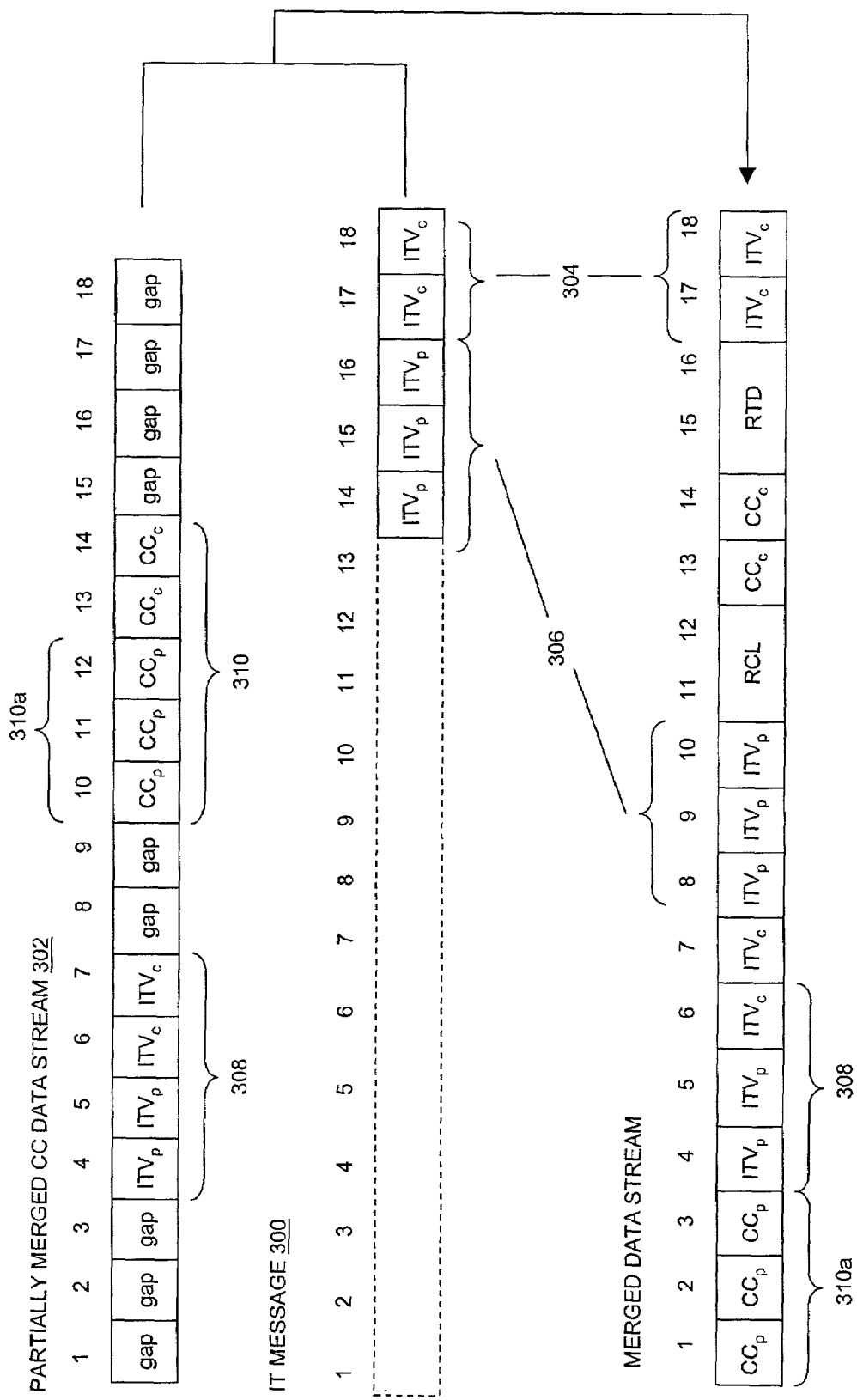
FIG. 11 is an example of merging an interactive television message into a partially merged closed caption data stream when a prior interactive television message is encountered during a search for group.

FIG. 11 illustrates the merging of an ITV message 300 into a partially merged CC data stream 302 when a prior ITV message is encountered during a search for gaps. The ITV message 300 in the illustrated example is originally assigned to time slots 14-18. However, only time slots 15-18 are available in the partially merged data stream 302 for placing the ITV message. Accordingly, the ITV message 300 is segmented so that the ITV command data 304 is placed in time slots 17 and 18 along with a RTD command in time slots 15 and 16. The data processor then goes back in time and identifies gaps in front of prior messages for placing the remainder 306 of the ITV message. In searching back in time, a prior ITV message 308 is encountered. According to the illustrated example, the gap in front of the prior ITV message 308 is not sufficiently large to contain the remainder 306 of the ITV message. The data processor 10 thus creates a gap for inserting the remainder 306 of the ITV message. In creating the gap, the data processor segments the payload portion 310a of the CC message and moves it as far back in time as possible. In this example, the payload portion 310a of the CC message is moved to time slots 1-3. The remainder 306 of the ITV message 300 is moved to the freed time slots 8-10. A RCL command is inserted in time slots 11 and 12 for resuming the loading and display of the prior CC message 310.

Although this invention has been described in certain specific embodiments, those skilled in the art will have no difficulty devising variations which in no way depart from the scope and spirit of the present invention. For example, although the invention has been described in terms of ITV and CC data, a person skilled in the art should recognize that the invention may apply to the merging of any lower priority data stream into a higher priority data stream for transmitting the merged data stream via a television signal. It is therefore to be understood that this invention may be practiced otherwise than is specifically described. Thus, the present embodiments of the invention should be considered in all respects as illustrative and not restrictive, the scope of the invention to be indicated by the appended claims and their equivalents rather than the foregoing description.

What is claimed is:

1. An interactive television (ITV) system comprising:
   a first-input for receiving a first data stream for a particular television program;
   a second input for receiving a second data stream for the particular television program, the first data stream having a higher priority than the second data stream; and
   a processing unit coupled to the first input and the second input, characterized in that the processing unit creates a gap in the first data stream for inserting at least a portion of data carried by the second data stream, the gap being selected in a location in the first data stream so as to allow the data carried by the second stream to be effectively displayed without disrupting display of data carried by the first data stream.

2. The system of claim 1, wherein the data carried by the first data stream is closed caption data.

3. The system of claim 1, wherein the data carried by the second data stream is interactive television data including interactive content.

4. The system of claim 3, wherein a reveal command is inserted in the gap, the reveal command commanding a receiver to display the interactive content.

5. An interactive television system comprising:
   a first input for receiving a first data stream for a particular television program, the first data system having a plurality of first data units;
   a second input for receiving a second data stream for the particular television program, the second data stream having a plurality of second data units; and
   a processing unit coupled to the first input and the second input, the processing unit including logic for:
   creating a gap between two first data units in the first data stream;
   inserting a first portion of the plurality of second data units into the created gap;
   detecting another gap in the first data stream; and
   electronically inserting a second portion of the plurality of second data units into the detected gap.

6. The system of claim 5, wherein the plurality of first data units are closed caption data units.

7. The system of claim 5, wherein the plurality of second data units are interactive television data units including interactive content.

8. The system of claim 5, wherein the created and detected gaps are time slots in a television signal containing no data units.

9. The system of claim 8, wherein the created gap is as close to a desired reveal time as possible.

10. The system of claim 5, wherein the first portion of the plurality of second data units includes a reveal command commanding a receiver to display interactive content.

11. The system of claim 5, wherein the two first data units are closed caption payload data displayed by a receiver in response to a closed caption reveal command.

12. In an interactive television system, a method for merging a first data stream for a particular television program, the first data system having a plurality of first data units, with a second data stream for the particular television program, the second data stream having a plurality of second data units, the first data stream having a higher priority than the second data stream, the method comprising:
   creating a gap between two first data units in the first data stream;
   inserting a first portion of the plurality of second data units into the created gap;
   detecting another gap in the first data stream; and
   electronically inserting a second portion of the plurality of second data units into the detected gap.

13. The method of claim 12, wherein the plurality of first data units are closed caption data units.

14. The method of claim 12, wherein the plurality of second data units are interactive television data units including interactive content.

15. The method of claim 12, wherein the created and detected gaps are time slots in the television signal containing no data units.

16. The method of claim 15, wherein the created gap is as close to a desired reveal time as possible.

17. The method of claim 12, wherein a reveal command is inserted in the gap, the reveal command commanding a receiver to display the interactive content.

18. The method of claim 12, wherein the two first data units are closed caption payload data displayed by a receiver in response to a closed caption reveal command.

19. In an interactive television (ITV) system, a method for merging a closed caption data stream and an ITV data stream, the closed caption data stream including closed caption reveal command data and closed caption payload data, and the ITV data stream including ITV reveal command data and ITV payload data, the method comprising:
- identifying an ITV reveal time slot for the ITV reveal command data, the ITV reveal command data commanding a receiver to display ITV content associated with the ITV payload data;
- determining whether the ITV reveal time slot is available;
- responsive to a determination that the ITV reveal time slot is assigned to the closed caption payload data:
  - segmenting at least the closed caption payload data assigned to the ITV reveal time slot; and
  - reassigning the segmented closed captioning payload data to one or more time slots earlier than the ITV reveal time slot; and
  - assigning the ITV reveal time slot to the ITV reveal command data.

20. The method of claim 19, wherein the closed caption reveal command data commands the receiver to display closed caption content associated with the closed caption payload data, the method further comprising:
- responsive to a determination that the ITV reveal time slot is assigned to the closed caption reveal command data:
  - segmenting at least a portion of the closed caption payload data assigned to one or more time slots preceding the ITV reveal time slot;
  - reassigning the segmented closed caption payload data to one or more time slots earlier than the one or more time slots preceding the ITV reveal time slot; and
  - assigning the one or more time slots preceding the ITV reveal time slot to at least the ITV reveal command data.

* * * * *